United States Patent
Brinckman et al.

(10) Patent No.: US 10,944,757 B2
(45) Date of Patent: Mar. 9, 2021

(54) GRANTING WIRELESS NETWORK ACCESS BASED ON APPLICATION AUTHENTICATION CREDENTIALS OF CLIENT DEVICES

(71) Applicant: Cisco Technology, Inc., San Jose, CA (US)

(72) Inventors: Bart Brinckman, Nevele (BE); Jerome Henry, Pittsboro, NC (US); Robert Edgar Barton, Richmond (CA); David Delano Ward, Alleur (BE)

(73) Assignee: Cisco Technology, Inc., San Jose, CA (US)

( * ) Notice: Subject to any disclaimer, the term of this patent is extended or adjusted under 35 U.S.C. 154(b) by 113 days.

(21) Appl. No.: 16/135,915

(22) Filed: Sep. 19, 2018

(65) Prior Publication Data
US 2020/0092296 A1   Mar. 19, 2020

(51) Int. Cl.
*H04L 29/06* (2006.01)
*H04L 12/46* (2006.01)
(Continued)

(52) U.S. Cl.
CPC ........ *H04L 63/102* (2013.01); *H04L 12/4633* (2013.01); *H04L 63/0815* (2013.01);
(Continued)

(58) Field of Classification Search
CPC ... H04L 12/4633; H04L 63/102; H04L 63/20; H04L 63/0815; H04L 63/0884; H04W 12/0806; H04W 12/06; H04W 12/08
See application file for complete search history.

(56) References Cited

U.S. PATENT DOCUMENTS 9,467,457 B2   10/2016   Si et al.
9,614,831 B2    4/2017   Shah et al.
(Continued)

FOREIGN PATENT DOCUMENTS

WO   2015050892 A1   4/2015

OTHER PUBLICATIONS

P. Funk et al., "Extensible Authentication Protocol Tunneled Transport Layer Security Authenticated Protocol Version 0 (EAP-TTLSv0)", Network Working Group, Request for Comments: 5281, Category: Informational, Aug. 2008, 51 pages.
(Continued)

*Primary Examiner* — Mohammad A Siddiqi (57) ABSTRACT

A method comprises obtaining, from a client device, a first set of application authentication credentials formatted in accordance with a first authentication protocol. The first set of application authentication credentials corresponds to a first user profile. The method includes translating the first set of application authentication credentials to a second set of application authentication credentials. The second set of application authentication credentials is formatted in accordance with a second authentication protocol different from the first authentication protocol and corresponds to the first user profile. The method includes providing the second set of application authentication credentials to an application authentication system. The method includes, in response to providing the second set of application authentication credentials to the application authentication system, obtaining, from the application authentication system, an application authentication indicator. In response to determining that the application authentication indicator indicates a successful authentication, granting the client device network access.

20 Claims, 6 Drawing Sheets

(51) Int. Cl.
*H04W 12/06* (2021.01)
*H04W 12/08* (2021.01)

(52) U.S. Cl.
CPC .......... *H04L 63/0884* (2013.01); *H04L 63/20* (2013.01); *H04W 12/06* (2013.01); *H04W 12/08* (2013.01)

(56) References Cited

U.S. PATENT DOCUMENTS

| | | | | |
|---|---|---|---|---|
| 2011/0271110 | A1* | 11/2011 | Ohba | H04W 12/04033 713/168 |
| 2014/0105103 | A1* | 4/2014 | Nethi | H04L 63/1408 370/328 |
| 2016/0013985 | A1* | 1/2016 | Reddy | H04L 41/5003 726/4 |
| 2016/0021097 | A1 | 1/2016 | Shrotri | |
| 2016/0219038 | A1* | 7/2016 | Stephenson | H04W 12/0609 |

OTHER PUBLICATIONS

D. Hardt, Ed., "The OAuth 2.0 Authorization Framework", Internet Engineering Task Force (IETF), Request for Comments: 6749, Obsoletes: 5849, Category: Standards Track, ISSN: 2070-1721, Oct. 2012, 76 pages.

Obinna Ethelbert et al., "A JSON Token-Based Authentication and Access Management Schema for Cloud SaaS Applications", 2017 IEEE 5th International Conference on Future Internet of Things and Cloud, DOI 10.1109/FiCloud.2017.29, https://www.researchgate.net/publication/320582545_A_JSON_Token-Based_Authentication_and_Access_Management_Schema_for_Cloud_SaaS_Applications, Oct. 2017, 7 pages.

Oracle, "Extend Oracle Fusion Application Cloud Service with an embedded Java application", https://docs.oracle.com/en/solutions/extend-sass-with-java-cloud-service-apps/securing-oracle-cloud-paas-saas-applications-using-oauth.html#GUID-167B7A64-2282-40EF-BC12-9A0013690E22, Jun. 5, 2015, 14 pages.

Joona Tykkylainen, "Configurable integrations with 3rd party identity providers in a multi-tenant SaaS application", May 27, 2016, 87 pages.

International Search Report and Written Opinion in counterpart International Application No. PCT/US2019/050559, dated Dec. 2, 2019, 13 pages.

Cloudessa, Inc., "RADIUS / AAA & Captive Portal Cloud Service", Revision 29, Sep. 29, 2013, 25 pages.

Cisco, "Configuring RADIUS or a LOCAL Authenticator in a Wireless LAN", Cisco IOS Wireless LAN Configuration Guide, pp. 1-26, Sep. 4, 2018.

\* cited by examiner

GRANTING WIRELESS NETWORK ACCESS BASED ON APPLICATION AUTHENTICATION CREDENTIALS OF CLIENT DEVICES

TECHNICAL FIELD

The present disclosure relates generally to networking, and in particular, granting wireless network access to client devices based on application authentication credentials of the client devices.

BACKGROUND

In many current systems, an enterprise operator provides a network. Within that network, the enterprise operator maintains an access control node that grants or denies access to client devices based on respective credentials obtained from the client devices. In other words, the access control node of the enterprise operator authenticates the client devices in order to grant the client devices access to the network. For example, the access control node maintains an active directory list of valid credentials, such as a list of valid user names and respective passwords, and compares the credentials obtained from a particular client device against the valid credentials in the list. If the credentials obtained from the particular client device match an entry in the list, the access control node grants the particular client device access to the network.

However, having the access control node maintain and utilize a credentialing system has several drawbacks. For example, the access control node expends processing and memory resources in storing the directory list and checking obtained credentials against the directory list. Moreover, in a network with multiple access control nodes, these processing and memory resources are utilized by each access control node. In effect, expensive redundancies are introduced across the network.

BRIEF DESCRIPTIONS OF THE DRAWINGS

For a better understanding of aspects of the various embodiments described herein and to show more clearly how they may be carried into effect, reference is made, by way of example only, to the accompanying drawings.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION OF EXAMPLE EMBODIMENTS

Numerous details are described herein in order to provide a thorough understanding of illustrative embodiments shown in the drawings. However, the drawings merely show some example aspects of the present disclosure and are therefore not to be considered limiting. Those of ordinary skill in the art will appreciate from the present disclosure that other effective aspects and/or variants do not include all of the specific details described herein. Moreover, well-known systems, methods, components, devices and circuits have not been described in exhaustive detail so as not to unnecessarily obscure more pertinent aspects of the embodiments described herein.

Overview

Various embodiments disclosed herein include apparatuses, systems, devices, and methods to enable granting a client device network access based on translated application authentication credentials. The method comprises obtaining, from a client device in a network, a first set of application authentication credentials formatted in accordance with a first authentication protocol. The first set of application authentication credentials corresponds to a first user profile. The method further includes translating the first set of application authentication credentials to a second set of application authentication credentials. The second set of application authentication credentials is formatted in accordance with a second authentication protocol that is different from the first authentication protocol. The second set of application authentication credentials corresponds to the first user profile. The method further includes providing the second set of application authentication credentials to an application authentication system. The method further includes, in response to providing the second set of application authentication credentials to the application authentication system, obtaining, from the application authentication system, an application authentication indicator. The method further includes, in response to determining that the application authentication indicator indicates a successful authentication, granting the client device access to the network.

In accordance with some embodiments, an admission access controller includes a communication interface, one or more processors, a non-transitory memory, and one or more programs. The one or more programs are stored in the non-transitory memory and configured to be executed by the one or more processors and the one or more programs include instructions for performing or causing performance of any of the methods described herein. In accordance with some embodiments, a non-transitory computer readable storage medium has stored therein instructions, which, when executed by one or more processors of an admission access controller, cause the admission access controller to perform or cause performance of any of the methods described herein. In accordance with some embodiments, an admission access controller includes: a communication interface, one or more processors, a non-transitory memory, and means for performing or causing performance of any of the methods described herein.

Example Embodiments

In current systems, an enterprise operator (e.g., a university, company, organization, etc.) maintains an access control node (e.g., AAA/RADIUS sever) that grants or denies access to client devices based on respective credentials obtained from the client devices. The access control node locally maintains (e.g., stores in memory) and utilizes a list of valid credentials, such as valid user name and password combinations. For example, the access control node maintains an active directory list including valid credential information. A particular client device wishing to join the network provides credentials to the access control node. In response, the access control node grants or denies network access to the client device based on whether the credentials provided by the client device match the valid credentials maintained at the access control node. For example, in some current systems, the access control node and the client device engage in this authentication process via the extensible authentication protocol (EAP).

However, utilizing the access control node in order to authenticate and subsequently grant client devices access to the network is problematic. For example, the access control node expends processing and memory resources in storing the valid credentials list and checking credentials obtained from a particular client device against the valid credentials list. Moreover, in a network with multiple access control nodes (e.g., peer RADIUS servers), these processing and memory resources are utilized by each access control node. In effect, expensive redundancies are imposed upon infrastructure of the network.

By contrast, in accordance with various embodiments disclosed herein, systems, methods, and devices provide translated application authentication credentials (e.g., cloud application credentials), obtained from a client device, and provide the translated application authentication credentials to an application authentication system that authenticates the translated application authentication credentials. Accordingly, instead of having an access control node maintain directory information (e.g., an active directory) in order to authenticate the credentials, the application authentication system (e.g., a web-based application authentication system) authenticates the translated application authentication credentials of the client device and returns an indication of the authentication result. Consequently, the access control node need not authenticate the client device, saving processing and memory resources associated with maintaining and utilizing a list of valid credentials. In addition, cloud-based credential system have become popular, making local ownership of a credential system less attractive.

For example, in some embodiments, an admission access controller translates layer two (L2) application authentication credentials obtained from the client device into corresponding layer seven (L7) application authentication credentials. The admission access controller provides the translated application authentication credentials to the application authentication system. In response, the admission access controller obtains an application authentication indicator from the application authentication system indicative of the result of the authentication performed by the application authentication system. Based on the application authentication indicator, the admission access controller grants or denies the client device access to the network.

Figure 1:
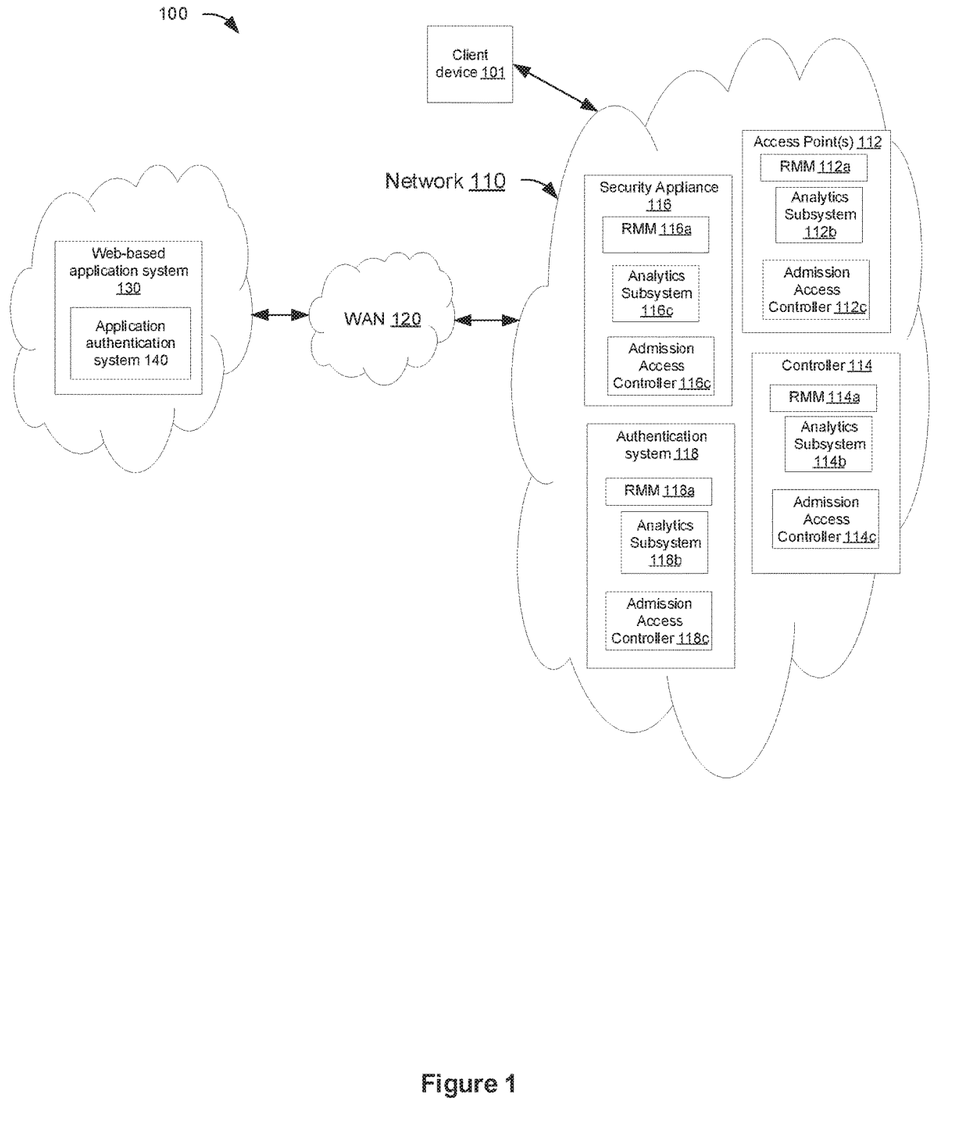
FIG. 1 is a block diagram of an example of a networking environment including one or more admission access controllers in accordance with some embodiments.

FIG. 1 is a block diagram of an example of a networking environment 100 including one or more admission access controllers in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein. To that end, as a non-limiting example, the networking environment 100 includes a client device 101, a network 110 including a number of networking devices, a wide area network (WAN) 120 (e.g., the Internet), and a web-based (e.g., cloud-based) application system 130 that includes an application authentication system 140.

Although only one client device 101 is illustrated in FIG. 1, one of ordinary skill in the art will appreciate that any number of client devices 101 may exist in the networking environment 100. In some embodiments, the client device 101 corresponds to a user equipment (UE), such as one of a smartphone, laptop, tablet, IoT sensor, autonomous vehicle device, AR/VR device, etc.

In various embodiments, the network 110 is characterized by a wireless RAT, such as an IEEE 802-based technology (e.g., Wi-Fi). In various embodiments, the network 110 corresponds to a wired network. In various embodiments, the network 110 includes a combination of wireless and wired network components. For example, in some embodiments, the client device 101 is wirelessly connected to the network 110 via a particular one of the one or more access points 112. As another example, in some embodiments, the client device 101 has a wired connection to the network 110.

The network 110 includes one or more access points (APs) 112, a controller 114 (e.g., WLAN controller), a security appliance 116, and an authentication system 118. One or ordinary skill in the art will appreciate that the network 110 may include fewer or additional of these and/or other network components in accordance with a desired operation of the network.

The one or more APs 112 provide respective wireless network coverage areas. Although the client device 101 may be within the respective coverage areas of multiple APs 112 at a given time, a particular one of the one or more APs 112 provides wireless network connectivity to the client device 101 at the given time. In other words, the client device 101 associates with one of the one or more APs 112. In some embodiments, the AP 112 includes a resource management module (RMM) 112a and/or an analytics subsystem 112b that are configured to provide management of data on each of a number of client devices 101 sharing one or more network resources. For example, in some embodiments, the RMM 112a and/or the analytics subsystem 112b are configured to monitor traffic to and/or from the client devices 101 and determine respective resource utilization values that are each representative of how much of a network resource is being utilized by a particular client device 101. In various embodiments, as illustrated in FIG. 1, additional networking devices in the network 110, such as the controller 114, the security appliance 116, the authentication system 118, or a combination thereof, include respective RMMs and/or analytics subsystems.

In various embodiments, the one or more APs 112 includes respective one or more admission access controllers 112c. The operation of an admission access controller is detailed, below.

In various embodiments, the networking environment 100 includes a distributed admission access controller mechanism. For example, in some embodiments, portions of the admission access controller are integrated within two or more of: the one or more APs 112 (the admission access controller 112c), the controller 114 (an admission access controller 114c), the security appliance 116 (an admission access controller 116c), or the authentication system 118 (an admission access controller 118c). According to various embodiments, the distributed portions of the admission access controller operate cooperatively (e.g., in concert). An example of a cooperative operation is described below, with reference to FIG. 2B.

In some embodiments, the network 110 further includes a controller 114 than manages the one or more APs 112. In some embodiments, the controller 114 corresponds to a wireless LAN controller (WLC). In some embodiments, the controller 114 corresponds to an intent-based networking system, such as Cisco's digital network architecture (DNA). In various embodiments, the controller 114 includes one or more of: an RRM 114a, an analytics subsystem 114b, or an admission access controller 114c.

In some embodiments, the network 110 further includes a security appliance 116 (e.g., a server) that protects the network 110 from unwanted and/or harmful traffic. For example, the security appliance 116 corresponds to one of a firewall, an antivirus scanning device, a content filtering device, an intrusion detection system, a prevention scanning device (e.g., penetration tester, vulnerability assessment system), or a combination thereof. In various embodiments, the security appliance 116 includes one or more of: an RRM 116a, an analytics subsystem 116b, or an admission access controller 116c.

In some embodiments, the network 110 further includes an authentication system 118. In some embodiments, the authentication system 118 corresponds to a layer two (L2) authentication server (e.g., AAA/RADIUS server), such as one commonly found in a given current enterprise deployment. However, unlike the current network deployment, the authentication system 118 disclosed herein does not authenticate the credentials of the client device 101 in order to grant the client device 101 network access. In various embodiments, the authentication system 118 includes one or more of: an RRM 118a, an analytics subsystem 118b, or an admission access controller 118c.

The networking environment 100 further includes a web-based (e.g., cloud-based) application system 130. In various embodiments, the web-based application system 130 enables one or more client device 101 to access shared networking resources (e.g., memory and processing resources) over the WAN 120 (e.g., the Internet). In some embodiments, the web-based application system 130 corresponds to a cloud server, such as a software as a service (SaaS) system or an infrastructure as a service (IaaS) system. In some embodiments, the web-based application system 130 corresponds to one of a logical cloud server (e.g., virtualization-based) or a physical cloud server. For example, rather than running a video conferencing application locally on the client device 101 (e.g., using resources of the client device 101), the client device 101 accesses the web-based application system 130. The web-based application system 130 allocates a portion of its networking resources to run the video conference application for the client device 101.

The application system 130 includes an application authentication system 140. The application authentication system 140 authenticates translated application authentication credentials provided by an admission access controller. In some embodiments, the application authentication system 140 corresponds to a layer seven (L7) authentication server, such as an open authorization (OAuth) server.

For example, the admission access controller obtains, from the client device 101, a first set of application authentication credentials formatted according to a first authentication protocol, such as a layer two authentication protocol (e.g., EAP). The admission access controller translates the first set of application authentication credentials to a second set of application authentication credentials formatted according to a different, second authentication protocol, such as a layer seven authentication protocol (e.g., OAuth). The admission access controller provides the second set of application authentication credentials to the application authentication system 140. The application authentication system 140 authenticates or does not authenticate the second set of application authentication credentials based on whether the second set of application authentication credentials are valid. For instance, the application authentication system 140 authenticates a cloud service username and password combination (e.g., username=Jane.Doe@Cisco.com; password=1234) because the combination is a valid combination. The application authentication system 140 provides a corresponding application authentication indicator to the admission access controller, which in turn grants or denies the client device 101 access to the network 110 based on the application authentication indicator. Notably, the admission access controller does not check the email and password combination against a stored directory because the application authentication system 140 performs this operation. Accordingly, resource utilization of the infrastructure of the network 110 is reduced.

Figure 2A:
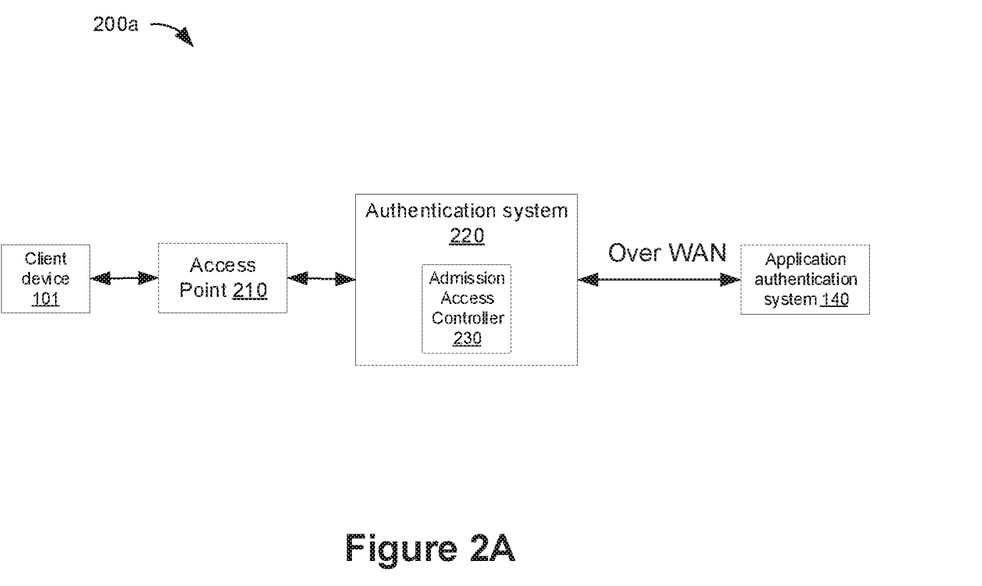
FIG. 2A is a block diagram of an example of a networking environment including an admission access controller in accordance with some embodiments.

FIG. 2A is a block diagram of an example of a networking environment 200a including an admission access controller in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein. To that end, as a non-limiting example, the networking environment 200a includes a client device 101, an access point 210, an authentication system 220 including an admission access controller 230, and an application authentication system 140. In various embodiments, the admission access controller 230 is similar to and adapted from the admission access controller 118c in FIG. 1.

The networking environment 200a is similar to or exemplifies many current network deployments. For example, many current enterprise deployments include an authentication system, such as a AAA/Radius server, that locally authenticates credentials of client devices attempting to gain access to the network. As illustrated in FIG. 2A, in various embodiments, the admission access controller 230 is integrated within the authentication system 220, such as the aforementioned AAA/Radius server in a current enterprise deployment. Advantageously, an enterprise operator need not modify existing infrastructure of a network in order to realize the benefits of the embodiments disclosed herein. For example, the enterprise operator need not purchase additional networking equipment.

Figure 2B:
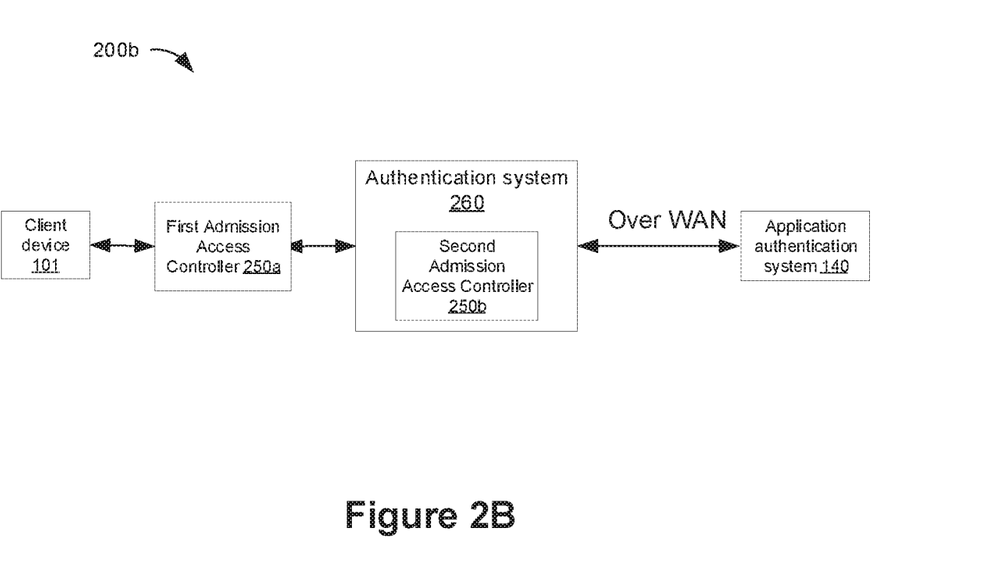
FIG. 2B is a block diagram of an example of a networking environment including a distributed admission access controller in accordance with some embodiments.

FIG. 2B is a block diagram of an example of a networking environment 200b including a distributed admission access controller in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein. To that end, as a non-limiting example, the networking environment 200b includes a client device 101, a first admission access controller 250a, an authentication system 260 including a second admission access controller 250b, and an application authentication system 140. In various embodiments, the first admission access controller 250a is similar to and adapted from the admission access controller 112c in FIG. 1. In various embodiments, the second admission access controller 250*b* within the authentication system 260 is similar to and adapted from the admission access controller 118*c* in FIG. 1.

As illustrated in FIG. 2B, admission access functionality is distributed among the first admission access controller 250*a* and the second admission access controller 250*b*. One of ordinary skill in the art will appreciate that the admission access functionality may be distributed in a variety of ways, such as across any number of the networking devices in FIG. 1 (e.g., the admission access controller 112*c*, the admission access controller 114*c*, the admission access controller 116, and/or the admission access controller 118*c*).

In various embodiments, the first admission access controller 250*a* performs the translation functionality and the second admission access controller 250*b* relays information to and from the first admission access controller 250*a*. For example, in some embodiments, the first admission access controller 250*a* translates a first set of application authentication credentials to a second set of application authentication credentials and provides the second set of application authentication credentials to the second admission access controller 250*b*. The second admission access controller 250*b* relays the second set of application authentication credentials to the application authentication system 140. The second admission access controller 250*b* relays an application authentication indicator from the application authentication system 140 to the first admission access controller 250*a*. Based on the application authentication indicator, the first admission access controller 250*a* determines whether the application authentication indicator indicates a successful authentication and grants or denies the client device 101 access to the network accordingly.

In various embodiments, the second admission access controller 250*b* performs the translation functionality and the first admission access controller 250*a* relays information to and from the second admission access controller 250*b*. For example, in some embodiments, the first admission access controller 250*a* relays a first set of application authentication credentials from the client device 101 to the second admission access controller 250*b*. The second admission access controller 250*b* translates the credentials, provides the translated credentials to the application authentication system 140, and in response obtains an application authentication indicator from the application authentication system 140. The second admission access controller 250*b* determines whether the application authentication indicator indicates a successful authentication and provides a corresponding access message (e.g., access accept or access deny) to the first admission access controller 250*a*. The first admission access controller 250*a* relays the access message to the client device 101, resulting in granting or denying the client device 101 access to the network.

In some embodiments, the first admission access controller 250*a* translates the credentials, whereas the second admission access controller 250*b* determines whether the application authentication indicator indicates a successful authentication, or vice versa. In some embodiments, other features disclosed herein are distributed among two or more networking elements in the network, such as the networking devices in the network 110 in FIG. 1.

Figure 3:
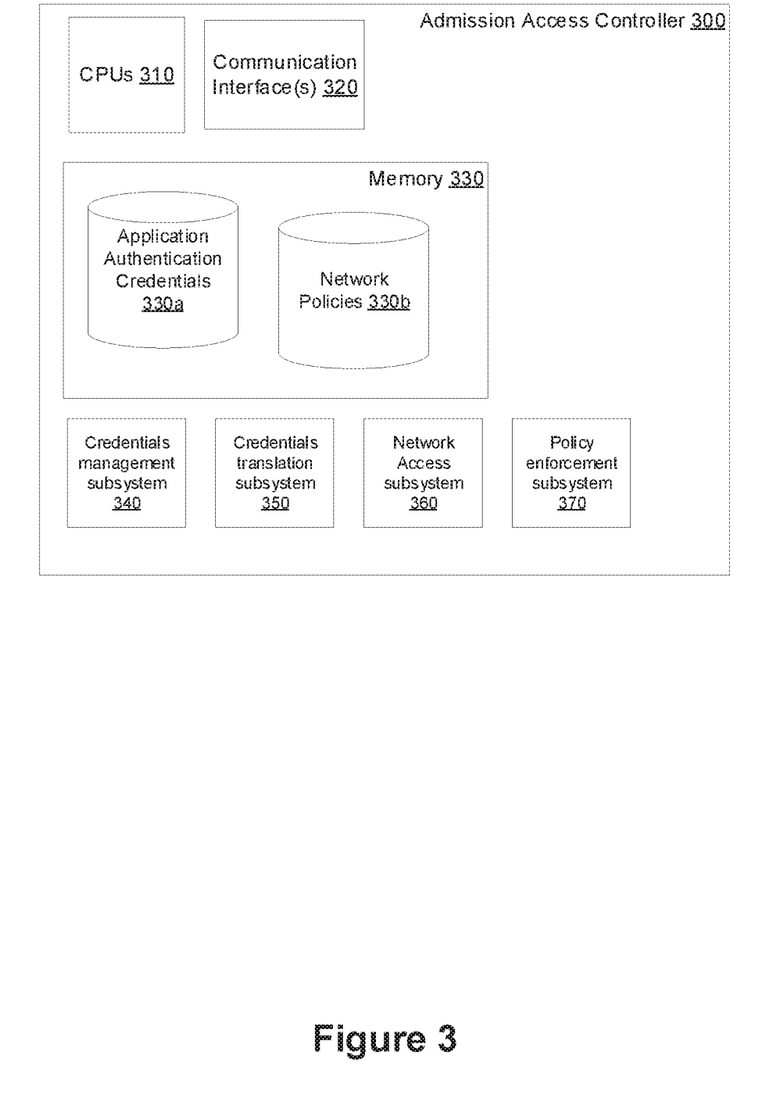
FIG. 3 is a block diagram of an admission access controller in accordance with some embodiments.

FIG. 3 is a block diagram of an admission access controller 300 in accordance with some embodiments. While pertinent features are shown, those of ordinary skill in the art will appreciate from the present disclosure that various other features have not been illustrated for the sake of brevity and so as not to obscure more pertinent aspects of the example embodiments disclosed herein.

In various embodiments, portions of the admission access controller 300 are distributed among a combination of networking devices in a network. For example, in some embodiments, portions of the admission access controller 300 are distributed among a combination of the one or more access points 112, the controller 114, the security appliance 116, or the authentication system 118 in FIG. 1. As another example, in some embodiments, the admission access controller 300 corresponds to the first admission access controller 250*a* and the second admission access controller 250*b* in FIG. 2B, collectively.

The admission access controller 300 includes one or more CPUs 310 that provide processing resources. The admission access controller 300 further includes one or more communication interfaces 320 including input and output interfaces for communicating with networking devices. The admission access controller 300 further includes a memory 330 (e.g., a non-transitory memory, such as RAM, ROM, etc.) that provides storage resources.

The admission access controller 300 further includes a credentials management subsystem 340 obtains a first set of application authentication credentials from a client device (e.g., the client device 101 in FIG. 1). The first set of authentication credentials is formatted in accordance with a first authentication protocol and corresponds to a first user profile. In some embodiments, the credentials management subsystem 340 allocates storage in the memory 330 for an application authentication credentials datastore 330*a*. The credentials management subsystem 340 may store first and/or second sets of application authentication credentials associated with the client device in the application authentication credentials datastore 330*a*. In some embodiments, the credentials management subsystem 340 determines whether the first set of application authentication credentials obtained from the client device is associated with a web-based application. In response to determining that the first set of application authentication credentials is associated with the web-based application, the credentials management subsystem 340 provides a corresponding message to a credentials translation subsystem 350 included within the admission access controller 300.

The credentials translation subsystem 350 translates the first set of application authentication credentials to the second set of application authentication credentials. The second set of application authentication credentials is formatted in accordance with a second authentication protocol that is different from the first authentication protocol. The second set of application authentication credentials corresponds to the first user profile. The credentials translation subsystem 350 further provides the second set of application authentication credentials to an application authentication system (e.g., the application authentication system 140 in FIG. 1).

The admission access controller 300 further includes a network access subsystem 360 obtains, from the application authentication system, an application authentication indicator. The network access subsystem 360 obtains the application authentication indicator in response to the credentials translation subsystem 350 providing the second set of application authentication credentials to the application authentication system. The network access subsystem 360 further grants the client device access to the network, in response to determining that the application authentication indicator indicates a successful authentication. In some embodiments, the network access subsystem 360 further denies the client device access to the network, in response to determining that the application authentication indicator indicates an unsuccessful authentication.

In various embodiments, the admission access controller 300 further includes a policy enforcement subsystem 370 that applies, to the client device, one or more respective network policies that are based on the application authentication indicator. In some embodiments, the policy enforcement subsystem 370 allocates storage in the memory 330 for a network policies datastore 330b. The policy enforcement subsystem 370 may store the application authentication indicator. In some embodiments, the application authentication indicator is indicative of policies to apply to the client device. For example, in some embodiments, the application authentication indicator corresponds to an access token including valet keys (e.g., OAuth valet keys) defining an authorization profile for the client device. In some embodiments, the policy enforcement subsystem 370 derives a change of authorization (CoA) profile for the client device based on the application authentication indicator. Accordingly, the admission access controller 300 may adjust an active session associated with the client device. In some embodiments, the policy enforcement subsystem 370 applies one or more access level policies to the client device based on the application authentication indicator. In some embodiments, policy enforcement subsystem 370 applies policies to the peer systems based on the application authentication indicator. For example, in some embodiments, the policy enforcement subsystem 370 is integrated within a RADIUS server, and the policy enforcement subsystem 370 facilities sharing the application authentication indicator with other peer RADIUS servers.

Figure 4:
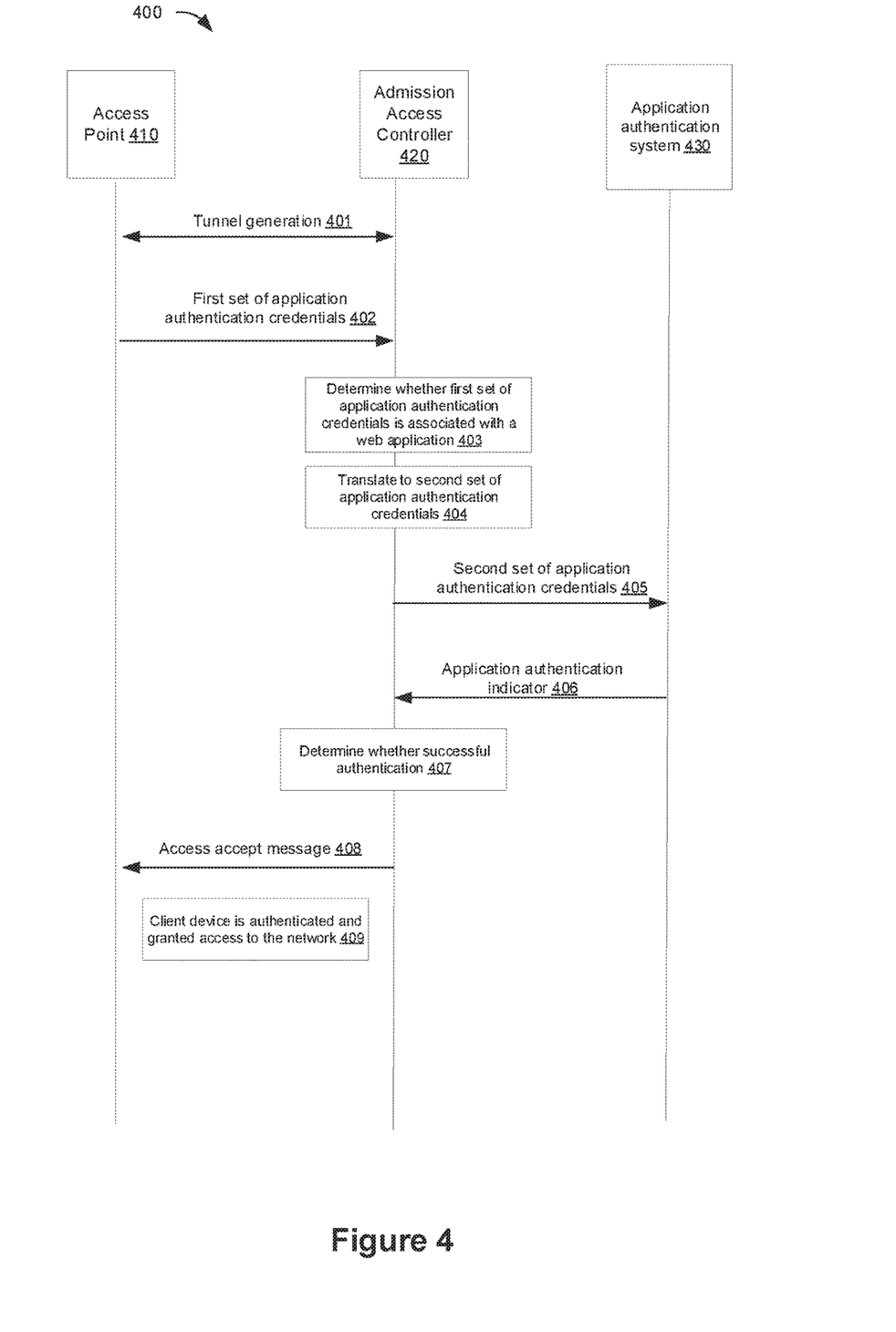
FIG. 4 is a conceptual diagram of an example of an access-granting flow in accordance with some embodiments.

FIG. 4 is a conceptual diagram of an example of an access-granting flow 400 in accordance with some embodiments. FIG. 4 involves an access point 410 (e.g., the access point 112 in FIG. 1), an admission access controller 420 (e.g., the admission access controller 300 in FIG. 3), and an application authentication system 430 (e.g., the application authentication system 140 in FIG. 1).

According to some embodiments, as represented by 401, the access point 410 and the admission access controller 420 generate a tunnel between each other. For example, in some embodiments, the access point 410 and the access controller 420 exchange initial EAP messages in order to generate an EAP tunnel, such as an EAP-TTLS tunnel.

As represented by 402, the access point 410 provides a first set of application authentication credentials to the admission access controller 420. The first set of application authentication credentials corresponds to a first user profile. For example, a client device (e.g., the client device 101 in FIG. 1) provides application authentication credentials corresponding to a user profile of Mike.Smith@Cisco.com:superspeed1234 to the access point 410 formatted in accordance with EAP. The access point 410 relays these credentials to the admission access controller 420. In some embodiments, the access point 410 relays the first set of application authentication over the tunnel.

As represented by 403, in some embodiments, the admission access controller 420 determines whether the first set of application authentication credentials is associated with a web application. The admission access controller 420 translates (step 404, below) the first set of application authentication credentials in response to an affirmative determination.

As represented by 404, the admission access controller 420 translates the first set of application authentication credentials to a second set of application authentication credentials. The second set of application authentication credentials is formatted in accordance with a second authentication protocol that is different from the first authentication protocol. However, the second set of application authentication credentials corresponds to the first user profile. Thus, continuing with the above example, the admission access controller 420 translates the first application authentication credentials to a second set of application authentication credentials that is formatted in accordance with the OAuth protocol. Nevertheless, the second set of application authentication credentials corresponds to the same user profile of Mike.Smith@Cisco.com:superspeed1234.

As represented by 405, the admission access controller 420 provides the second set of application authentication credentials to the application authentication system 430.

As represented by 406, in response to providing the second set of application authentication credentials to the application authentication system 430, the admission access controller 420 obtains an application authentication indicator from the application authentication system 430. For example, in some embodiments, the admission access controller 420 obtains an OAuth access token from the application authentication system 430.

As represented by block 407, the admission access controller 420 determines whether the application authentication indicator indicates a successful authentication. As represented by block 408, in response to determining that the application authentication indicator indicates a successful authentication, the admission access controller 420 provides an access accept message to the access point 410. Accordingly, as represented by block 409, the client device is granted access to the network. In some 802-based embodiments, in response to obtaining the access accept message, the access point 410 permits the client device to communicate with the network. For example, in some embodiments, the admission access controller 420 provides a change of authorization (CoA) message to the access point 410 in order to direct the access point 410 to permit the client device to communicate with the network.

Figure 5:
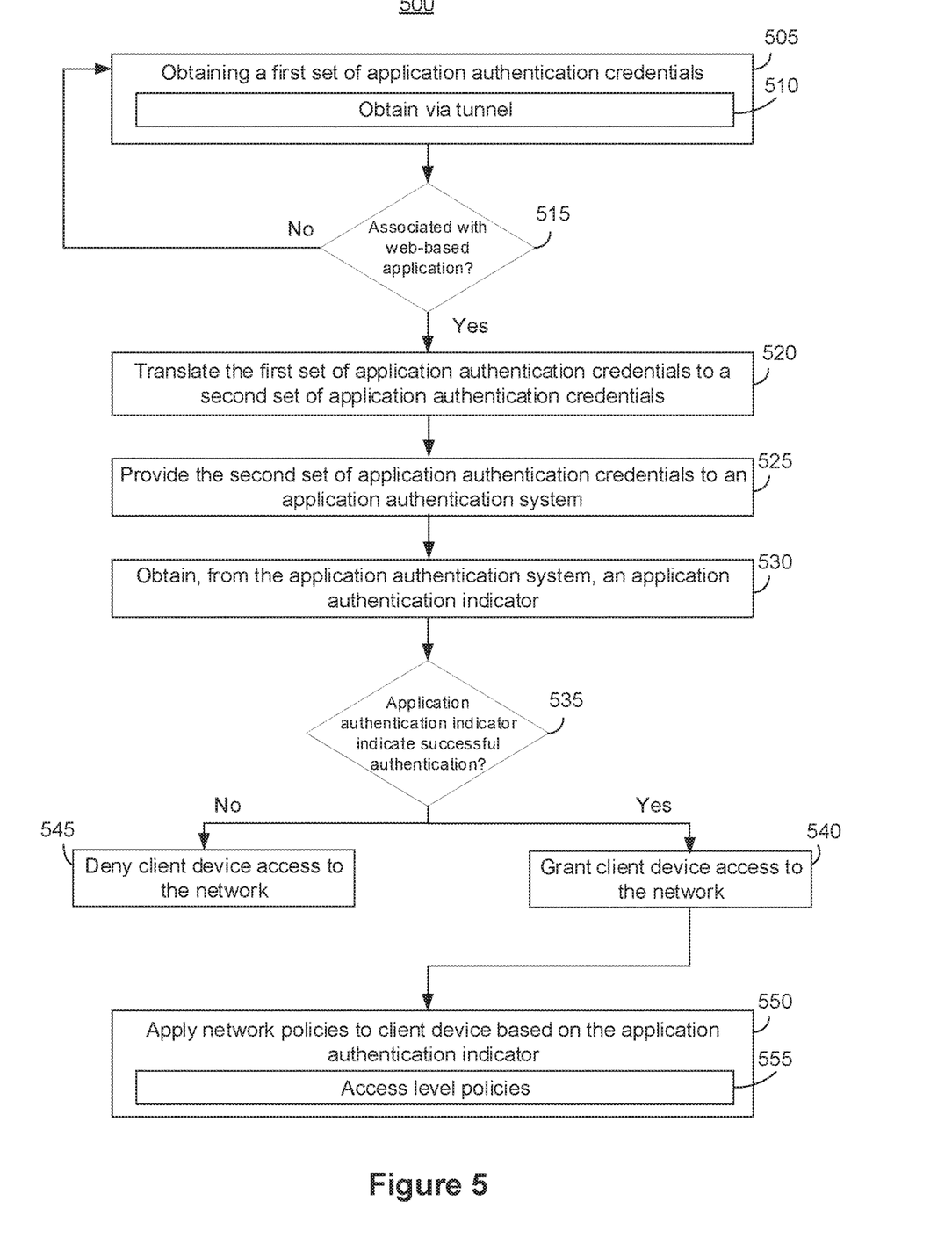
FIG. 5 is a flowchart representation of a method of granting network access based on translated application authentication credentials in accordance with some embodiments.

FIG. 5 is a flowchart representation of a method 500 of granting network access based on translated application authentication credentials in accordance with some embodiments. In various embodiments, the method 500 is performed by an admission access controller, such as the admission access controller 300 in FIG. 3. Briefly, the method 500 includes translating application authentication credentials obtained from a client device into a format compatible with an application authentication system in order to authenticate the translated credentials and grant or deny the client network access.

To that end, as represented by block 505, the method 500 includes obtaining, from a client device in the network, a first set of application authentication credentials formatted in accordance with a first authentication protocol. The first set of application authentication credentials corresponds to a first user profile. In various embodiments, the first set of application authentication credentials corresponds to a user name and password associated with a web/cloud application. In various embodiments, first set of application authentication credentials is compatible with a layer two authentication protocol, such as EAP. For example, in some embodiments, the first authentication protocol is an inner EAP running on top of RADIUS. In some embodiments, the client device corresponds to a user equipment (UE), such as a mobile phone, IoT, laptop, tablet, AR/VR, autonomous vehicle sensor, and/or the like. In some embodiments, the network is an 802.1-based wireless network, such as Wi-Fi.

In some embodiments, as represented by block 510, the first set of application authentication credentials is obtained from the client device via a tunnel. For example, an admission access controller obtains the first set of application authentication credentials from the client device via a previously generated EAP-TTLS tunnel.

In some embodiments, as represented by block 515, the method 500 includes determining whether the first set of application authentication credentials is associated with a web-based application. In response to determining that the first set of application authentication credentials is associated with the web-based application, the method 500 continues to block 520. In response to determining that the first set of application authentication credentials is not associated with the web-based application, the method 500 reverts back to block 505.

As represented by block 520, the method 500 includes translating the first set of application authentication credentials to a second set of application authentication credentials. The second set of application authentication credentials is formatted in accordance with a second authentication protocol that is different from the first authentication protocol. In some embodiments, the second set of application authentication credentials corresponds to a user name and password associated with a web/cloud application compatible with a layer seven authentication protocol, such as OAuth. For example, the first and second sets of application authentication credentials are associated with oliver.twist@cisco.com: can_i_have_some_more1234, but these credentials are formatted in accordance with EAP vis-à-vis the first set of application authentication credentials and formatted in accordance with OAuth vis-à-vis the second set of application authentication credentials.

As represented by block 525, the method 500 includes providing the second set of application authentication credentials to an application authentication system. For example, with reference to FIG. 2A, the admission access controller 230 provides the second set of application authentication credentials to the application authentication system 140 over a WAN (e.g., the Internet). In some embodiments, the application authentication system corresponds to an OAuth server. In some embodiments, the application authentication system corresponds to a token-based software as a service (SaaS) system. In some embodiments, the admission access controller is separate from the application authentication system (e.g., not collocated)

As represented by block 530, the method 500 includes, in response to providing the second set of application authentication credentials to the application authentication system, obtaining, from the application authentication system, an application authentication indicator. In some embodiments, the application authentication indicator corresponds to an access token (e.g., OAuth token) that validates the identity associated with the client device. In various embodiments, the application authentication indicator corresponds to valet keys (e.g., OAuth valet keys) that define an authorization profile for the client device. For example, in some embodiments, the admission access controller utilizes the valet keys in order to effect policies towards the client device.

As represented by block 535, in some embodiments, the method 500 includes determining whether the application authentication indicator indicates a successful authentication. In response to determining that the application authentication indicator indicates the successful authentication, the method 500 continues to block 540. In some embodiments, in response to determining that the application authentication indicator indicates an unsuccessful authentication, the method 500 continues to block 545. As represented by block 540, the method includes granting the client device access to the network. As represented by block 545, the method includes denying the client device access to the network.

In some embodiments, as represented by block 550, in response to determining that the application authentication indicator indicates the successful authentication, the method 500 includes applying, to the client device, one or more respective network policies that are based on the application authentication indicator. As represented by block 555, in some embodiments, the one or more respective network policies correspond to one or more respective access level policies. For example, in some embodiments, the application authentication indicator corresponds to an access token including valet keys (e.g., OAuth valet keys) defining an authorization profile for the client device. In some embodiments, the policy enforcement subsystem derives a change of authorization (CoA) profile for the client device based on the application authentication indicator. Accordingly, the admission access controller may adjust an active session associated with the client device. Moreover, in some embodiments, the admission access controller is integrated within a RADIUS server and applying the network policy includes sharing the application authentication indicator with other peer RADIUS servers.

Figure 6:
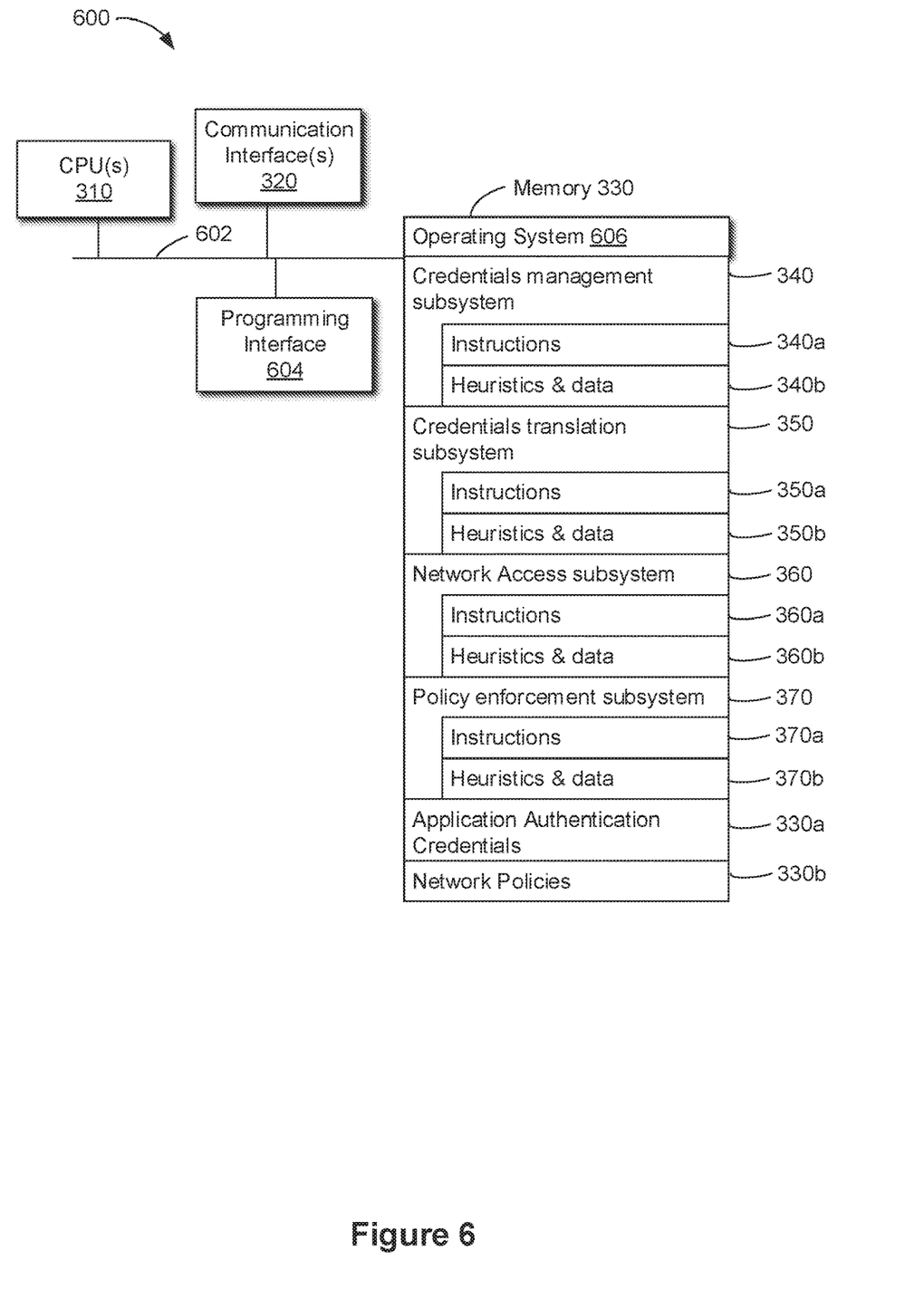
FIG. 6 is a block diagram of an admission access controller in accordance with some embodiments.

FIG. 6 is a block diagram of an admission access controller 600 in accordance with some embodiments. In some embodiments, the admission access controller 600 is similar to and adapted from the admission access controller 300 in FIG. 3. While certain specific features are illustrated, those skilled in the art will appreciate from the present disclosure that various other features have not been illustrated for the sake of brevity, and so as not to obscure more pertinent aspects of the embodiments disclosed herein.

To that end, as a non-limiting example, in some embodiments the admission access controller 600 includes one or more processing units (CPUs) 310, one or more communication interfaces 320, a memory 330, a programming (I/O) interface 604, and one or more communication buses 602 for interconnecting these and various other components.

In some embodiments, the one or more communication buses 602 include circuitry that interconnects and controls communications between system components. The memory 330 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. The memory 330 optionally includes one or more storage devices remotely located from the one or more CPUs 310. The memory 330 includes a non-transitory computer readable storage medium. In some embodiments, the memory 330 or the non-transitory computer readable storage medium of the memory 330 stores the following programs, modules and data structures, or a subset thereof including an optional operating system 606, a credentials management subsystem 340, a credentials translation subsystem 350, a network access subsystem 360, a policy enforcement subsystem 370, an application authentication credentials datastore 330a, and a network policies datastore 330b.

The operating system 606 includes procedures for handling various basic system services and for performing hardware dependent tasks.

In some embodiments, the credentials management subsystem 340 is configured to obtain, from a client device in the network, a first set of application authentication credentials formatted in accordance with a first authentication protocol, wherein the first set of application authentication credentials corresponds to a first user profile. To that end, in various embodiments, the credentials management subsystem 340 includes instructions and/or logic 340a and heuristics and metadata 340b. In some embodiments, the credentials management subsystem 340 stores the first set of application authentication credentials in the application authentication credentials datastore 330a.

In some embodiments, the credentials translation subsystem 350 is configured to translate the first set of application authentication credentials to a second set of application authentication credentials, wherein the second set of application authentication credentials is formatted in accordance with a second authentication protocol that is different from the first authentication protocol, wherein the second set of application authentication credentials corresponds to the first user profile. The credentials translation subsystem 350 is configured to provide the second set of application authentication credentials to an application authentication system. To that end, in various embodiments, the credentials translation subsystem 350 includes instructions and/or logic 350a and heuristics and metadata 350b. In some embodiments, the credentials translation subsystem 350 stores the second set of application authentication credentials in the application authentication credentials datastore 330a.

In some embodiments, the network access subsystem 360 is configured to obtain, from the application authentication system, an application authentication indicator, in response to providing the second set of application authentication credentials to the application authentication system. The network access subsystem 360 is configured to grant the client device access to the network, in response to determining that the application authentication indicator indicates a successful authentication. To that end, in various embodiments, the network access subsystem 360 includes instructions and/or logic 360a and heuristics and metadata 360b.

In some embodiments, the policy enforcement subsystem 370 is configured to apply to the client device, one or more respective network policies that are based on the application authentication indicator. To that end, in various embodiments, the policy enforcement subsystem 370 includes instructions and/or logic 370a and heuristics and metadata 370b. In some embodiments, the policy enforcement subsystem 370 stores policy information in the network policies 330b datastore.

Moreover, FIG. 6 is intended more as functional description of the various features which may be present in a particular embodiment as opposed to a structural schematic of the embodiments described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various embodiments. The actual number of modules and the division of particular functions and how features are allocated among them will vary from one embodiment to another, and may depend in part on the particular combination of hardware, software, and/or firmware chosen for a particular embodiment.

While various aspects of embodiments within the scope of the appended claims are described above, it should be apparent that the various features of embodiments described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first", "second", etc. may be used herein to describe various elements, these elements should not be limited by these terms. These terms are only used to distinguish one element from another. For example, a first network could be termed a second network, and, similarly, a second network could be termed a first network, which changing the meaning of the description, so long as all occurrences of the "first network" are renamed consistently and all occurrences of the "second network" are renamed consistently. The first network and the second network are both networks, but they are not the same networks.

The terminology used herein is for the purpose of describing particular embodiments only and is not intended to be limiting of the claims. As used in the description of the embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at an admission access controller associated with a network, the admission access controller including one or more processors, a communication interface, and a non-transitory memory:
   obtaining, from a client device in the network, a first set of application authentication credentials formatted in accordance with a first authentication protocol, wherein the first set of application authentication credentials corresponds to a first user profile;
   determining whether the first set of application authentication credentials is associated with a web-based application;
   in response to determining that the first set of application authentication credentials is associated with the web-based application, translating the first set of application authentication credentials to a second set of application authentication credentials, wherein the second set of application authentication credentials is formatted in accordance with a second authentication protocol that is different from the first authentication protocol, and wherein the second set of application authentication credentials corresponds to the first user profile;

providing the second set of application authentication credentials to an application authentication system;

in response to providing the second set of application authentication credentials to the application authentication system, obtaining, from the application authentication system, an application authentication indicator;

in response to determining that the application authentication indicator indicates a successful authentication, granting the client device access to the network; and applying, to the client device, one or more respective network policies that are based on the application authentication indicator, wherein the one or more respective network policies correspond to one or more respective access level policies.

2. The method of claim 1, wherein the first authentication protocol corresponds to a layer two (L2) extensible authentication protocol (EAP).

3. The method of claim 1, wherein the second authentication protocol corresponds to a layer seven (L7) open authorization (OAuth) protocol.

4. The method of claim 1, wherein the admission access controller is separate from the application authentication system.

5. The method of claim 1, wherein the client device has a wireless connection to the network.

6. The method of claim 1, wherein the client device has a wired connection to the network.

7. The method of claim 1, wherein the first set of application authentication credentials is obtained from the client device via a tunnel.

8. The method of claim 7, wherein the tunnel is an extensible authentication protocol (EAP) tunnel.

9. The method of claim 1, wherein the translating includes translating the first set of application authentication credentials having a format of the first authentication protocol to the second set of application authentication credentials having a format of the second authentication protocol.

10. An admission access controller, comprising:
one or more processors;
a non-transitory memory;
a communication interface;
a credentials management subsystem to obtain, from a client device in a network, a first set of application authentication credentials formatted in accordance with a first authentication protocol, wherein the first set of application authentication credentials corresponds to a first user profile;
a credentials translation subsystem to:
  determine whether the first set of application authentication credentials is associated with a web-based application;
  in response to determining that the first set of application authentication credentials is associated with the web-based application, translate the first set of application authentication credentials to a second set of application authentication credentials, wherein the second set of application authentication credentials is formatted in accordance with a second authentication protocol that is different from the first authentication protocol, and wherein the second set of application authentication credentials corresponds to the first user profile, and
  provide the second set of application authentication credentials to an application authentication system; and
a network access subsystem to:
  obtain, from the application authentication system, an application authentication indicator, in response to providing the second set of application authentication credentials to the application authentication system, and
  grant the client device access to the network, in response to determining that the application authentication indicator indicates a successful authentication; and
a policy enforcement subsystem to apply, to the client device, one or more respective network policies that are based on the application authentication indicator, wherein the one or more-respective network policies correspond to one or more respective access level policies.

11. The admission access controller of claim 10, wherein the first authentication protocol corresponds to a layer two (L2) extensible authentication protocol (EAP).

12. The admission access controller of claim 10, wherein the second authentication protocol corresponds to a layer seven (L7) open authorization (OAuth) protocol.

13. The admission access controller of claim 10, wherein the client device has a wireless connection to the network.

14. The admission access controller of claim 10, wherein the client device has a wired connection to the network.

15. The admission access controller of claim 10, wherein the first set of application authentication credentials is obtained from the client device via a tunnel.

16. The admission access controller of claim 15, wherein the tunnel is an extensible authentication protocol (EAP) tunnel.

17. A non-transitory computer readable medium storing one or more programs, the one or more programs comprising instructions, which, when executed by one or more processors, cause the one or more processors to:
obtain, from a client device in a network, a first set of application authentication credentials formatted in accordance with a first authentication protocol, wherein the first set of application authentication credentials corresponds to a first user profile;
determine whether the first set of application authentication credentials is associated with a web-based application;
in response to determining that the first set of application authentication credentials is associated with the web-based application, translate the first set of application authentication credentials to a second set of application authentication credentials, wherein the second set of application authentication credentials is formatted in accordance with a second authentication protocol that is different from the first authentication protocol, and wherein the second set of application authentication credentials corresponds to the first user profile;
provide the second set of application authentication credentials to an application authentication system;
in response to providing the second set of application authentication credentials to the application authentication system, obtain, from the application authentication system, an application authentication indicator;

in response to determining that the application authentication indicator indicates a successful authentication, grant the client device access to the network; and apply, to the client device, one or more respective network policies that are based on the application authentication indicator, wherein the one or more respective network policies correspond to one or more respective access level policies.

18. The non-transitory computer readable medium of claim 17, wherein the first authentication protocol corresponds to a layer two (L2) extensible authentication protocol (EAP) and the second authentication protocol corresponds to a layer seven (L7) open authorization (OAuth) protocol.

19. The non-transitory computer readable medium of claim 17, wherein the first set of application authentication credentials is obtained from the client device via a tunnel.

20. The non-transitory computer readable medium of claim 19, wherein the tunnel is an extensible authentication protocol (EAP) tunnel.

* * * * *